United States Patent
Levola

(10) Patent No.: US 8,314,993 B2
(45) Date of Patent: Nov. 20, 2012

(54) SPLIT EXIT PUPIL EXPANDER

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 584 days.

(21) Appl. No.: 12/227,730

(22) PCT Filed: Apr. 3, 2007

(86) PCT No.: PCT/IB2007/000875
§ 371 (c)(1),
(2), (4) Date: Sep. 25, 2009

(87) PCT Pub. No.: WO2007/141606
PCT Pub. Date: Dec. 13, 2007

(65) Prior Publication Data
US 2011/0096401 A1    Apr. 28, 2011

(30) Foreign Application Priority Data
Jun. 2, 2006 (WO) .................. PCT/IB2006/001456

(51) Int. Cl.
G02B 27/14 (2006.01)
G02B 5/18 (2006.01)
(52) U.S. Cl. ........................................ 359/630; 359/569
(58) Field of Classification Search .................. 359/566, 359/569, 629–630, 632, 831, 834, 837; 349/62–65; 362/610, 615–617, 619, 621, 623, 625, 628
See application file for complete search history.

(56) References Cited

U.S. PATENT DOCUMENTS

| | | | |
|---|---|---|---|
| 6,117,923 A | 9/2000 | Amagai et al. | 523/440 |
| 6,805,490 B2 | 10/2004 | Levola | 358/67 |
| 7,206,107 B2 | 4/2007 | Levola | 359/34 |
| 7,609,445 B2 | 10/2009 | Hamagishi | |
| 2004/0062502 A1 | 4/2004 | Levola | |
| 2004/0212776 A1 | 10/2004 | Spitzer et al. | |
| 2004/0233534 A1 | 11/2004 | Nakanishi et al. | 359/572 |
| 2006/0132914 A1 | 6/2006 | Weiss et al. | |

FOREIGN PATENT DOCUMENTS

| | | |
|---|---|---|
| EP | 1215522 | 6/2002 |
| JP | 57014806 A | 1/1982 |
| JP | 08036147 | 2/1996 |
| JP | 2003215318 | 7/2003 |
| JP | 2005173091 | 6/2005 |
| JP | 2005266023 | 9/2005 |
| JP | 2006501499 | 1/2006 |
| WO | 99/52002 | 10/1999 |
| WO | 03/032017 A2 | 4/2003 |
| WO | 2004055556 A1 | 7/2004 |
| WO | 2004/109349 A2 | 12/2004 |
| WO | 2006008734 A2 | 1/2006 |

(Continued)

OTHER PUBLICATIONS

JP2003215318 1 page English Language Abstract.

(Continued)

*Primary Examiner* — Stephone Allen
*Assistant Examiner* — Kimberly N Kakalec
(74) *Attorney, Agent, or Firm* — Alston & Bird LLP

(57) ABSTRACT

The specification and drawings present a new apparatus and method for using a split exit pupil expander to provide general diffractive optics method that uses a plurality of diffractive elements for expanding the exit pupil of a display of an electronic device for viewing.

25 Claims, 7 Drawing Sheets

FOREIGN PATENT DOCUMENTS

WO            2006008734 A3      1/2006

OTHER PUBLICATIONS 20040062502 1 page English Language Abstract.

English language abstract for JP2005173091 (1 page).

English language abstract for JP2005266023 (1 page).

English language abstract for JP08036147 (1 page).

Tapani Levola, Diffractive Optics for Virtual Reality Displays, J. of SID, 14/5, 2006 p. 467-475.

Tapani Levola, 7.1: Invited Paper: Novel Diffractive Optical Components for Near to Eye Displays, J. of SID, 2006, ISSN0006-0966X/06/3701-0000.

Tapani Levola, 22.1: Invited Paper: Diffractive Optics for Virtual Reality Displays, EuroDisplay 2005, p. 538-541.

M. Breidne, et. al., Blazed holographic gratings, Optica Acta, 26/11, 1979, p. 1427-1441.

J. Michael Miller, et. al., Design and fabrication of binary slanted surface-relief gratings for a planar optical interconnection, Applied Optics, 36/23, Aug. 10, 1997, p. 5717-5727.

Y. Amitai, et. al., Visor-display design based on planar holographic optics, Applied Optics, 34/8, Mar. 10, 1995, p. 1352-1356.

Kahn International™, Private Line Report on Projection Display, vol. 7, No. 10, Apr. 20, 2001, Focus: Doing it with stripes, Ed. F. Kahn. Ph.D.

Gardner, E. et al., *52:3: An Improved Polarizing Beamsplittler LCOS Projection Display Based on Wire-Grid Polarizers*, SID 01 Digest, 2001 SID, pp. 1282-1285.

Wang, B. et al., *Compact Slanted Grating Couplers*, Optics Express, 12/15, Jul. 26, 2004, pp. 3313-3316.

Search Report for European Application No. EP 07 73 4196 dated Jan. 5, 2012.

International Search Report for Application No. PCT/IB2006/001472 dated Jan. 19, 2007.

International Search Report for Application No. PCT/IB2006/001456 dated Jan. 19, 2007.

Office Action for Japanese Application No. 2009-512693 dated Oct. 4, 2011.

SPLIT EXIT PUPIL EXPANDER

PRIORITY AND CROSS-REFERENCE TO RELATED APPLICATION

This application is a US National Stage Application from PCT International Application No.W02007IB000875 filed on Apr. 3, 2007 (International Publication No. W02007141606).

This application a is a continuation-in-part of and claiming priority from the PCT Application Number PCT/IB/2006/001456 filed on Jun. 2, 2006 with the International Bureau of WIPO.

TECHNICAL FIELD

The present invention relates generally to a display device and, more specifically, to a diffractive optics method that uses a plurality of diffractive elements for expanding the exit pupil of a display for viewing.

BACKGROUND ART

While it is a common practice to use a low-resolution liquid-crystal display (LCD) panel to display network information and text messages in a mobile device, it is preferred to use a high-resolution display to browse rich information content of text and images. A microdisplay-based system can provide full color pixels at 50-100 lines per mm. Such high-resolution is generally suitable for a virtual display. A virtual display typically consists of a microdisplay to provide an image and an optical arrangement for manipulating light emerging from the image in such a way that it is perceived as large as a direct view display panel. A virtual display can be monocular or binocular.

The size of the beam of light emerging from imaging optics toward the eye is called exit pupil. In a Near-to-Eye Display (NED), the exit pupil is typically less than 10 mm in diameter. Further enlarging the exit pupil makes using the virtual display significantly easier, because there is no need for the interpupillary distance (IPD) adjustment or accurate positioning of the optics with respect to the eyes.

DISCLOSURE OF THE INVENTION

According to a first aspect of the invention, an apparatus, comprising: a split substrate of optical material having a first surface and a second surface, the split substrate comprising a first part and a second part which are physically separated and configured to rotate relative to each other around a line which separates the first and the second parts in a predetermined angle range; two diffractive elements disposed on the first or the second surface and configured to receive an input optical beam, wherein one of the two diffractive elements is disposed on the first part and another of the two diffractive elements is disposed on the second part, respectively, and the two diffractive elements are substantially next to each other and adjacent to the line which separates the first and the second parts; and two further diffractive elements disposed on the first or the second surface, wherein one of the two further diffractive elements is disposed on the first part and another of the two further diffractive elements is disposed on the second part, respectively, wherein at least part of the input optical beam is diffracted in the two diffractive elements to provide two diffracted optical beams substantially equally divided between the first part and the second part, respectively, substantially within the first and second surfaces, and at least part of the diffracted optical beams in each of the first part and the second part is further coupled out of the split substrate by diffraction in each of the two further diffractive elements to provide substantially identical two output optical beams with an expanded exit pupil in one or two dimensions.

According further to the first aspect of the invention, the apparatus may be configured using at least one condition of: a) two areas, each occupied by one of the two diffractive elements, are symmetric relative to the line which separates the first and the second parts, and b) two further areas, each occupied by one of the two further diffractive elements, are symmetric relative to the line which separates the first and the second parts.

According further to the first aspect of the invention, the two diffractive elements may have an asymmetric groove shape such that the input optical beam diffracted by each of the two diffractive elements may be substantially coupled only to a part, out of the first and the second parts, in which the each of the two diffractive elements may be disposed.

Still further according to the first aspect of the invention, the two diffractive elements may have an asymmetric groove shape and may be slanted gratings with a slanting angle of more than 20 degrees.

According further to the first aspect of the invention, the two diffractive elements may be asymmetric such that their groove shapes are mirror images of each other with respect to the line which separates the first and the second parts.

According still further to the first aspect of the invention, the two diffractive elements and the two further diffractive elements may be disposed on one surface, the first surface or the second surface of the first and second parts of the split substrate.

According further still to the first aspect of the invention, an absorbing material may be deposited on at least one of: a) an end of at least one of the first and the second parts in an area of their physical separation along the line, and b) a surface of the split substrate opposite to the surface with disposed the two diffractive elements.

According yet further still to the first aspect of the invention, the grooves of the two diffractive elements may be symmetric relative to the line which separates the first and the second parts.

Yet still further according to the first aspect of the invention, each part, the first and the second part of the split substrate, may comprise an intermediate diffractive element such that the at least part of the optical beam diffracted in the first or the second diffractive element is first coupled to the intermediate diffractive element, which then couples, using a further diffraction in the intermediate diffractive element, the at least part of the diffracted optical beam to one of the two further diffractive elements disposed on the each part, to provide a two-dimensional exit pupil expansion of the input optical beam by the each part. Further, the apparatus may be configured that the intermediate diffractive element has an odd number of first order diffractions or an even number of further first order reflections. Still further, each of the two diffractive elements comprises periodic lines with a period d and the intermediate diffractive element comprises further periodic lines with a period d' which may be equal to:

$$d' = \frac{d}{\left(1 + \frac{d}{\lambda}\sin\alpha\right)2\cos\rho},$$

wherein α is an angle between a normal to the first part or the second part and a normal to a plane comprising the first part and the second part when the first part and the second part are rotated in the predetermined angle range to lie both in said plane, ρ is an angle between the periodic lines and the further periodic lines, and λ is a wavelength of the input optical beam.

According to a second aspect of the invention, a method, comprises: receiving an input optical beam by two diffractive elements disposed on a first or a second surface of a split substrate made of optical material, the split substrate comprising a first part and a second part which are physically separated and configured to rotate relative to each other around a line which separates the first and the second parts in a predetermined angle range, and wherein one of the two diffractive elements is disposed on the first part and another of the two diffractive elements is disposed on the second part, respectively, and the two diffractive elements are substantially next to each other and adjacent to the line which separates the first and the second parts, and two areas, each occupied by one of the two diffractive elements, are symmetric relative to the line which separates the first and the second parts; diffracting at least part of the input optical beam in the two diffractive elements to provide two diffracted optical beams substantially equally divided between the first part and the second part, respectively, substantially within the first and second surfaces; coupling at least part of the diffracted optical beams in each of the first part and the second part out of the split substrate by diffraction in each of two further diffractive elements to provide substantially identical two output expanded optical beams with expanded exit pupil in one or two dimensions, wherein the two further diffractive elements are disposed on the first or the second surface, wherein one of the two further diffractive elements is disposed on the first part and another of the two further diffractive elements is disposed on the second part, respectively.

According further to the second aspect of the invention, the two diffractive elements may have an asymmetric groove shape such that the input optical beam diffracted by each of the two diffractive elements is substantially coupled only to a part, out of the first and the second parts, in which the each of the two diffractive elements is disposed.

Further according to the second aspect of the invention, the two diffractive elements may be asymmetric such that their groove shapes are mirror images of each other with respect to the line which separates the first and the second parts.

Still further according to the second aspect of the invention, an absorbing material may be deposited on at least one of: a) an end of at least one of the first and the second parts in an area of their physical separation along the line, and b) a surface of the split substrate opposite to the surface with disposed the two diffractive elements.

According to a third aspect of the invention, an electronic device, comprises:
a data processing unit;
an optical engine operatively connected to the data processing unit for receiving image data from the data processing unit;
a display device operatively connected to the optical engine for forming an image based on the image data; and
an exit pupil expander comprising:
a split substrate of optical material having a first surface and a second surface, the split substrate comprising a first part and a second part which are physically separated and configured to rotate relative to each other around a line which separates the first and the second parts in a predetermined angle range;

two diffractive elements disposed on the first or the second surface and configured to receive an input optical beam, wherein one of the two diffractive elements is disposed on the first part and another of the two diffractive elements is disposed on the second part, respectively, and the two diffractive elements are substantially next to each other and adjacent to the line which separates the first and the second parts; and two further diffractive elements disposed on the first or the second surface, wherein one of the two further diffractive elements is disposed on the first part and another of the two further diffractive elements is disposed on the second part, respectively, wherein at least part of the input optical beam is diffracted in the two diffractive elements to provide two diffracted optical beams substantially equally divided between the first part and the second part, respectively, substantially within the first and second surfaces, and at least part of the diffracted optical beams in each of the first part and the second part is further coupled out of the split substrate by diffraction in each of the two further diffractive elements to provide substantially identical two output optical beams with an expanded exit pupil in one or two dimensions.

Further according to the third aspect of the invention, the electronic device may further comprise: an EPE angle adjustment block configured to rotate the first part and the second part relative to each other around the line.

Still further according to the third aspect of the invention, the electronic device may be a digital camera, a computer game device, a wireless device, a portable device or a mobile terminal.

According further to the third aspect of the invention, the electronic device may be configured using at least one condition of: a) two areas, each occupied by, one of the two diffractive elements, are symmetric relative to the line which separates the first and the second parts, and b) two further areas, each occupied by one of the two further diffractive elements, are symmetric relative to the line which separates the first and the second parts.

According still further to the third aspect of the invention, the two diffractive elements may have an asymmetric groove shape such that the input optical beam diffracted by each of the two diffractive elements is substantially coupled only to a part, out of the first and the second parts, in which the each of the two diffractive elements is disposed.

According yet further still to the third aspect of the invention, the two diffractive elements may be asymmetric such that their groove shapes are mirror images of each other with respect to the line which separates the first and the second parts.

According further still to the third aspect of the invention, the two diffractive elements and the two further diffractive elements may be disposed on one surface, the first surface or the second surface of the first and second parts of the split substrate.

Yet still further according to the third aspect of the invention, an absorbing material may be deposited on at least one of: a) an end of at least one of the first and the second parts in an area of their physical separation along the line, and b) a surface of the split substrate opposite to the surface with disposed the two diffractive elements.

According to a fourth aspect of the invention, a goggle, comprises:
  a wearable housing; and
    an exit pupil expander, operatively attached to the wearable housing, the exit pupil expander comprising:
    a split substrate of optical material having a first surface and a second surface, the split substrate comprising a first part and a second part which are physically separated and configured to rotate relative to each other around a line which separates the first and the second parts in a predetermined angle range; two diffractive elements disposed on the first or the second surface and configured to receive an input optical beam, wherein one of the two diffractive elements is disposed on the first part and another of the two diffractive elements is disposed on the second part, respectively, and the two diffractive elements are substantially next to each other and adjacent to the line which separates the first and the second parts; and two further diffractive elements disposed on the first or the second surface, wherein one of the two further diffractive elements is disposed on the first part and another of the two further diffractive elements is disposed on the second part, respectively, wherein at least part of the input optical beam is diffracted in the two diffractive elements to provide two diffracted optical beams substantially equally divided between the first part and the second part, respectively, substantially within the first and second surfaces, and at least part of the diffracted optical beams in each of the first part and the second part is further coupled out of the split substrate by diffraction in each of the two further diffractive elements to provide substantially identical two output optical beams with an expanded exit pupil in one or two dimensions, such that each of the two output optical beams is provided to only one part, left or right, of the goggles.

According further to the fourth aspect of the invention, the goggle may further comprise: an EPE angle adjustment block, configured to provide an adjustment signal to the exit pupil expander for rotating the first and second parts relative to each other in the predetermined angle range.

According to a fifth aspect of the invention, an apparatus, comprises:
  two means for diffraction,
    for receiving an input optical beam, wherein the two means for diffraction are disposed on a first or a second surface of a split substrate made of optical material, the split substrate comprising a first part and a second part which are physically separated and configured to rotate relative to each other around a line which separates the first and the second parts in a predetermined angle range, and wherein one of the two means for diffraction is disposed on the first part and another of the two means for diffraction is disposed on the second part, respectively, and the two means for diffraction are substantially next to each other and adjacent to the line which separates the first and the second parts, and two areas, each occupied by one of the two means for diffraction, are symmetric relative to the line which separates the first and the second parts, and
    for diffracting at least part of the input optical beam in the two means for diffraction to provide two diffracted optical beams substantially equally divided between the first part and the second part, respectively, substantially within the first and second surfaces; and
  two further means for diffraction, for coupling at least part of the diffracted optical beams in each of the first part and the second part out of the split substrate by diffraction in each of two further means for diffraction to provide substantially identical two output expanded optical beams with expanded exit pupil in one or two dimensions,
    wherein the two further means for diffraction are disposed on the first or the second surface, wherein one of the two further means for diffraction is disposed on the first part and another of the two further diffractive elements is disposed on the second part, respectively.

According further to the fifth aspect of the invention, the two means for diffraction may be two in-coupling diffraction gratings and the two further means for diffraction may be two out-coupling diffraction gratings.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1A:
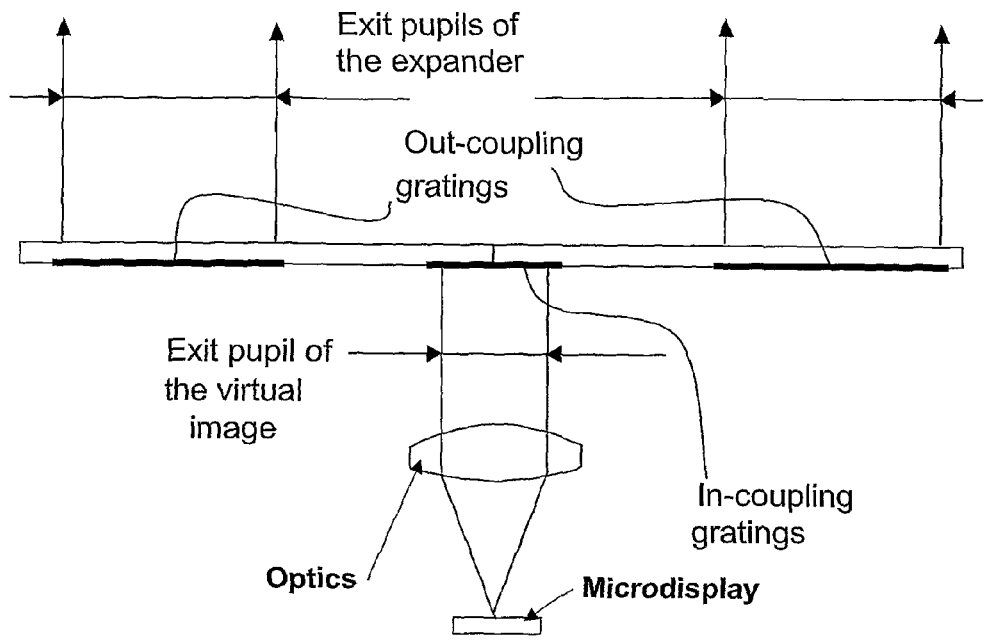
FIGS. 1a and 1b are schematic representations of a virtual reality display with a diffractive exit pupil expander as shown in FIG. 1a and of an out-coupling grating of the diffractive exit pupil expander, shown in FIG. 1b.

A new method and apparatus are presented for using a split exit pupil expander to provide (instead of a flat exit pupil expander) a general diffractive optics method that uses a plurality of diffractive elements for expanding the exit pupil of a display of an electronic device for viewing. The embodiments of the present invention can be applied to a broad optical spectral range of optical beams but most importantly to a visible part of the optical spectrum where the optical beams are called light beams.

According to embodiments of the present invention, the optical device (e.g., the optical device is a part of a virtual reality display) can comprise a split substrate made of optical material having a first surface and an opposing second surface, wherein the split substrate comprising a first part and a second part (or left and right part) which are physically separated and configured to rotate relative to each other around a line which separates the first and the second parts in a predetermined angle range.

Moreover, two diffractive elements (or in-coupling diffraction gratings) can be disposed on the first or the second surface and configured to receive an input optical beam, wherein one of these two diffractive elements is disposed on the first part and another of the two diffractive elements is disposed on the second part, respectively, and said two diffractive elements are substantially next to each other and adjacent to the line which separates the first and the second parts, and two areas, each occupied by one of said two diffractive elements, can be symmetric relative to the line which separates the first and the second parts. Thus, at least part of the input optical beam is diffracted in the two diffractive elements to provide two diffracted optical beams substantially equally divided between the first part and the second part, respectively, substantially within the first and second surfaces due to a total internal reflection. Then the two parts can expand the exit pupil of the input optical beam independently in one or two dimensions to provide substantially identical two output optical beams.

In case of a simple one-dimensional exit pupil expansion, two further diffractive elements (or out-coupling diffraction gratings) can be disposed on the first or the second surface (e.g., the two further diffractive elements may have parallel periodic lines), wherein one of the two further diffractive elements is disposed on the first part and another of said two diffractive elements is disposed on the second part, respectively, and two further areas, each occupied by one of said two further diffractive elements, can be symmetric relative to the line which separates the first and the second parts, thus at least part of the diffracted optical beams in each of the first part and the second part of the split substrate is further coupled out of the split substrate by diffraction (as known in the art) in each of the two further diffractive elements, thus providing substantially identical two output optical beams. It is noted that the two diffractive elements and the two further diffractive elements can be disposed on one surface or on different surfaces of said split substrate.

In case of a two-dimensional exit pupil expansion, each of the first and the second parts of the split substrate can comprise an intermediate diffractive element such that the at least part of the optical beam diffracted in the first or the second diffractive element is first coupled to the intermediate diffractive element, which then couples, using a further diffraction in the intermediate diffractive element, the at least part of the diffracted optical beam to one of the two further diffractive elements disposed on each part, thus providing the two-dimensional exit pupil expansion of the input optical beam by the each of the first and the second parts. The intermediate diffractive element can have an odd number of first order diffractions or an even number of further first order reflections as known in the art and, e.g., described by T. Levola in "Diffractive Optics for Virtual Reality Displays", SID Eurodisplay 05, Edinburg (2005), SID 02 Digest, Paper 22.1.

According to embodiments of the present invention, the two diffractive elements (or the in-coupling diffraction gratings) can be implemented using a variety of different types of diffraction gratings, e.g., planar diffraction gratings manufactured using lithographic methods or classically ruled (having different groove angles and profiles, such as binary, triangular, sinusoidal, etc.). The two diffractive elements (i.e., their grooves) can be symmetric or asymmetric relative to the line which separates the first and the second parts. The term "asymmetric" in regard to the grooves of the two in-coupling gratings can have two aspects: a) when periodic lines (or grooves) of the two gratings are not parallel, and b) when grooves of the two gratings have different slanted angles. Therefore, one possibility is to have non-parallel asymmetric periodic lines in the two in-coupling diffraction gratings, thus re-directing only wanted components in each part of the substrate to the corresponding out-coupling gratings. Another solution (which can be combined with periodic line asymmetry) is to use slanted gratings (e.g., using a slanting angle of at least more than 20 degrees and optimally between 35 and 50 degrees) for increasing the coupling efficiency and reducing an "optical crosstalk" between the first and the second parts (or left and right parts) of the split substrate. In other words, the asymmetric gratings (used as the two diffractive elements) can provide that the input optical beam diffracted by each of the two diffractive elements is substantially coupled only in a desired direction to the part in which said each of the two diffractive elements is disposed.

Furthermore, according to an embodiment of the present invention, the two slanted gratings are asymmetric such that their slanting angles are equal but have opposite signs relative to the optical axis of the system creating the input optical beam, i.e., the groove shapes are mirror images of each other with respect to the line which separates the first and the second parts. This minimizes the optical crosstalk between the two parts of the split substrate (i.e., to improve the image contrast). Moreover, an absorbing material can be deposited on the first and/or the second part in an area of their physical separation along the line which separates the first and the second parts. The contrast can be further improved by providing an absorbing material on the opposite surface of the split substrate (i.e., opposite to the surface with the disposed input diffractive elements). The width of this absorbing material should be optimized (e.g., to be approximately the same as the thickness of the substrate) in order to absorb only optical beams propagating in unwanted directions.

Figure 1B:
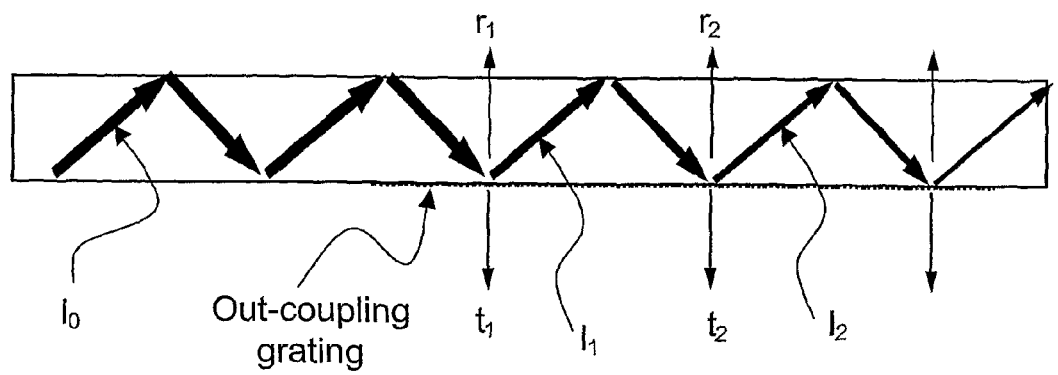

FIG. 1a and FIG. 1b show examples among others of schematic representations of: a virtual reality display with a diffractive exit pupil expander (EPE) as shown in FIG. 1a providing two substantially identical images for the right and left eyes using an out-coupling grating, shown in FIG. 1b. The light is coupled out from the out-coupling grating. The amount of out-coupling at each time the beam meets the grating depends on the grating properties. The system can be designed so that at least for one wavelength and incoming angle the output is uniform, i.e. $r_1 = r_2 = \ldots$, as shown in FIG. 1b, wherein $r_1, r_2, \ldots$ and $t_1, t_2, \ldots$ are reflected and transmitted optical beams out of the EPE, respectively, and I1, I2 . . . are reflected optical beams inside the EPE by the total internal reflection. The example of the virtual reality display of FIG. 1a with the out-coupling grating shown in FIG. 1b, can be used for applying embodiments of the present invention. FIGS. 2-6 demonstrate different embodiments of the present invention.

Figure 2A:
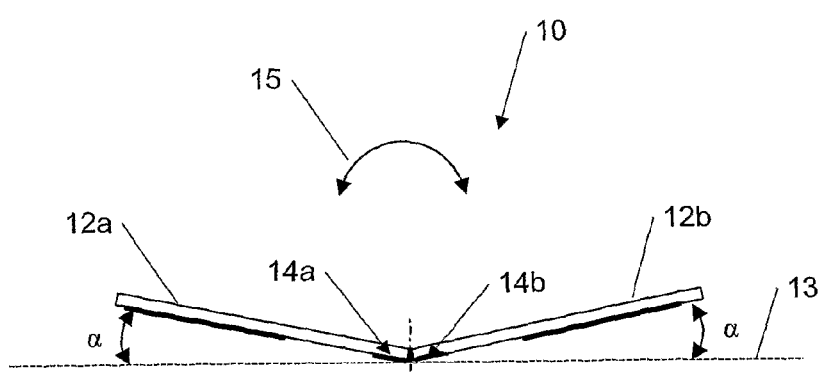
FIGS. 2a and 2b are schematic representations (cross-sectional and top views shown in FIGS. 2a and 2b, respectively) of a split one-dimensional diffractive exit pupil expander, according to an embodiment of the present invention.
Figure 2B:
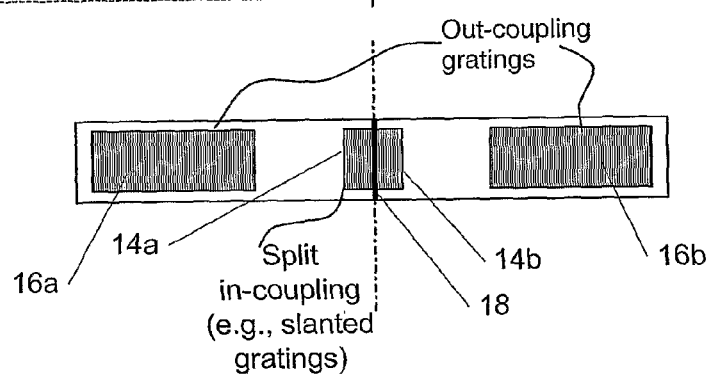

FIGS. 2a and 2b show examples among others of schematic representations (cross-sectional and top views shown in FIGS. 2a and 2b, respectively) of a split one-dimensional diffractive exit pupil expander (EPE) 10, according to an embodiment of the present invention. The EPE 10 comprises a split substrate comprising two adjacent parts 12a and 12b that are physically separated on a line 18 two parts. These two parts 12a and 12b are configured to rotate in a direction 15 relative to each other around the line 18 in a predetermined angle range which provides the flexibility in the virtual reality display design (angle α is an angle between the adjacent part 12a or 12b and a plane 13 which comprises the two parts 12a and 12b in a flat position, which is equivalent to an angle between a normal to the adjacent part 12a or 12b and a normal to the horizontal plane 13). The part 12a comprises the in-coupling grating 14a and an out-coupling grating 16a and the part 12b comprises the in-coupling grating 14b and an out-coupling grating 16b, respectively. The adjacent gratings 14a and 14b can be identical (or symmetric) or asymmetric as further shown in FIG. 3. It is noted that the in-coupling gratings 14a and 14b can generally be means for diffraction or a structural equivalence (or an equivalent structure) thereof. Similarly, the out-coupling gratings 16a and 16b can generally be further means for diffraction or a structural equivalence (or equivalent structure) thereof.

Figure 3A:
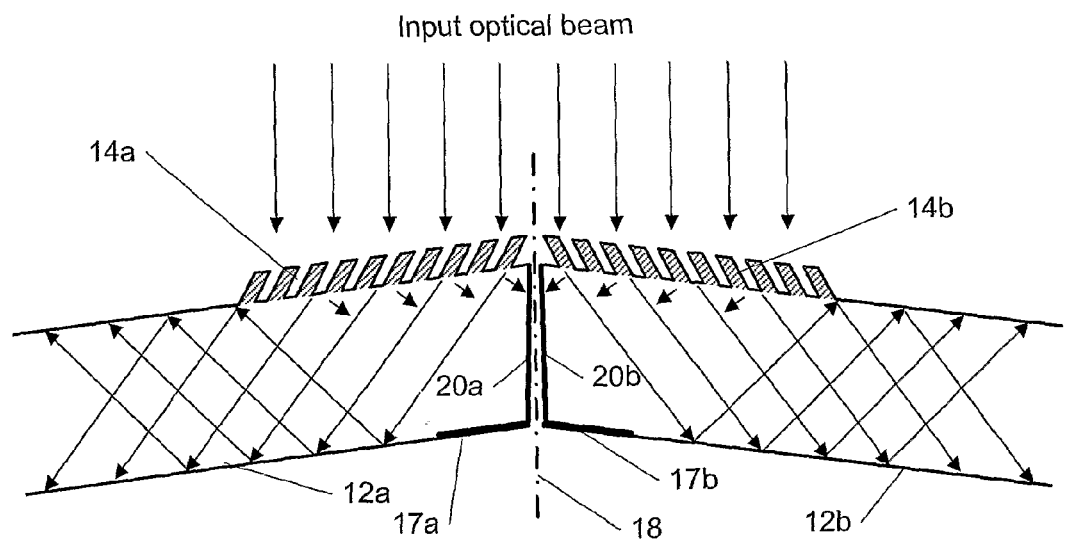
FIGS. 3a and 3b are schematic representations of a split in-coupling grating using an exit pupil expander, according to embodiments of the present invention.

FIG. 3a is one example among others of a schematic representation of a split exit pupil expander 10 using slanted asymmetric in-coupling gratings 14a and 14b (diffractions grooves of gratings 14a and 14b face different direction relative to the optical axis of the system creating the input optical beam), according to an embodiment of the present invention. According to a further embodiment, the ends of the diffraction gratings 14a and 14b can be coated with absorbing materials (e.g., coatings) 20a and 20b along the line 18 to further isolate (optically) the two parts 12a and 12b.

The optical contrast can be further improved by providing absorbing materials (e.g., an absorbing coating) 17a and 17b on the surfaces of the split substrates 12a and 12b opposite to the substrate surface with the disposed input diffraction gratings 14a and 14b in a vicinity of the line 18 (as shown in FIG. 3a). If the width of the absorbing area is optimized to be small enough compared to the total width of the gratings 14a and 14b as shown in FIG. 3a, only the unwanted optical beams will be absorbed. These unwanted beams are the optical beams which are transmitted by the gratings 14a and 14b without diffracting and those diffracted beams that propagate in unwanted directions. The absorbing materials 17a and 17b can be used in addition or instead of absorbing material 20a and 20b.

Figure 3B:
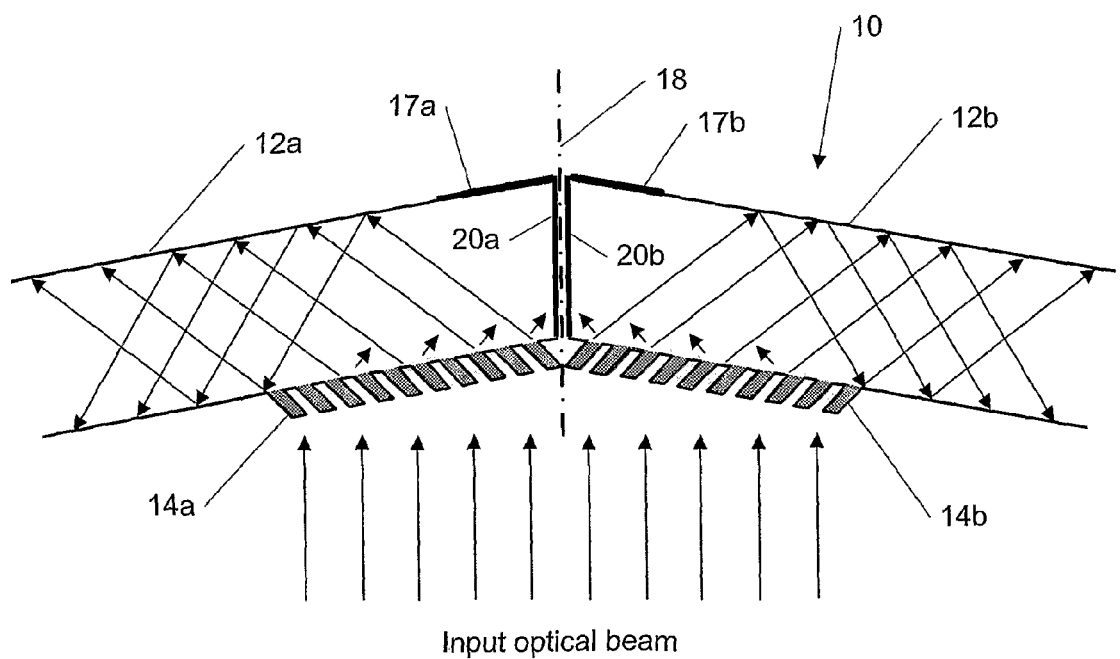

FIG. 3b is another example among others of a schematic representation of a split exit pupil expander 10 using slanted asymmetric in-coupling gratings 14a and 14b, according to an embodiment of the present invention. The configuration is similar to the expander 10 shown in FIG. 3a but with the input optical beam coming from the side of the observer, which makes the system slightly more compact.

Figure 4A:
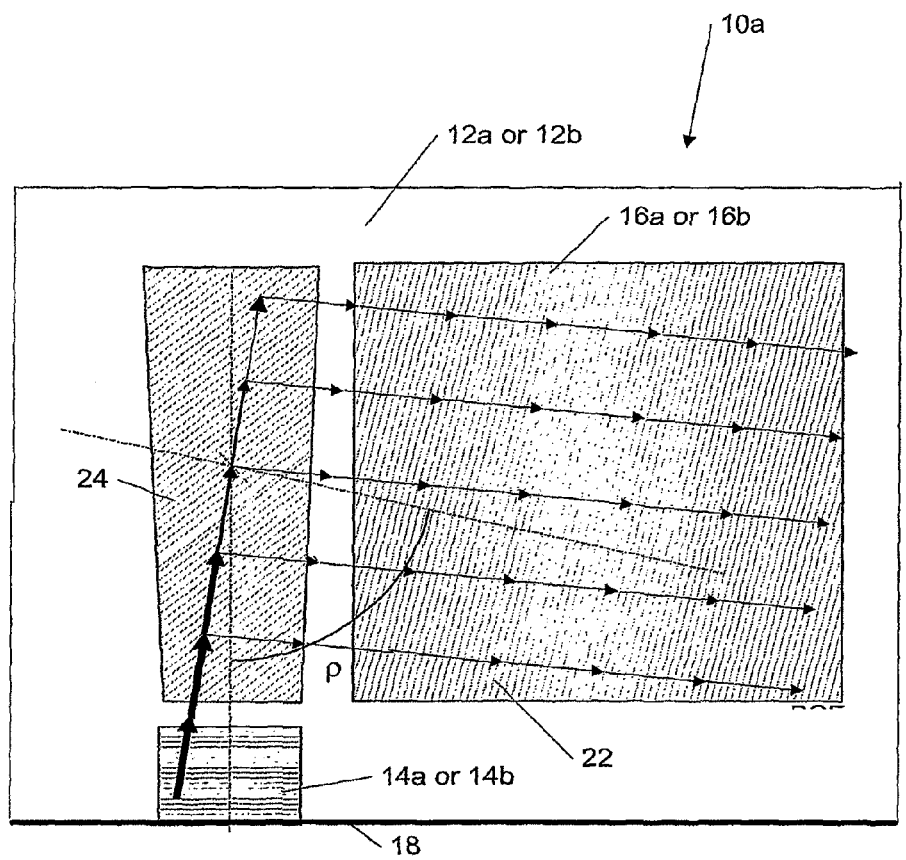
FIGS. 4a and 4b are schematic representations of one part (out of two) of a split two-dimensional diffractive exit pupil expander, wherein an intermediate diffractive element (grating) has an odd number of first order diffractions (shown in FIG. 4a) or an even number of further first order reflections (shown in FIG. 4b), according to an embodiment of the present invention.
Figure 4B:
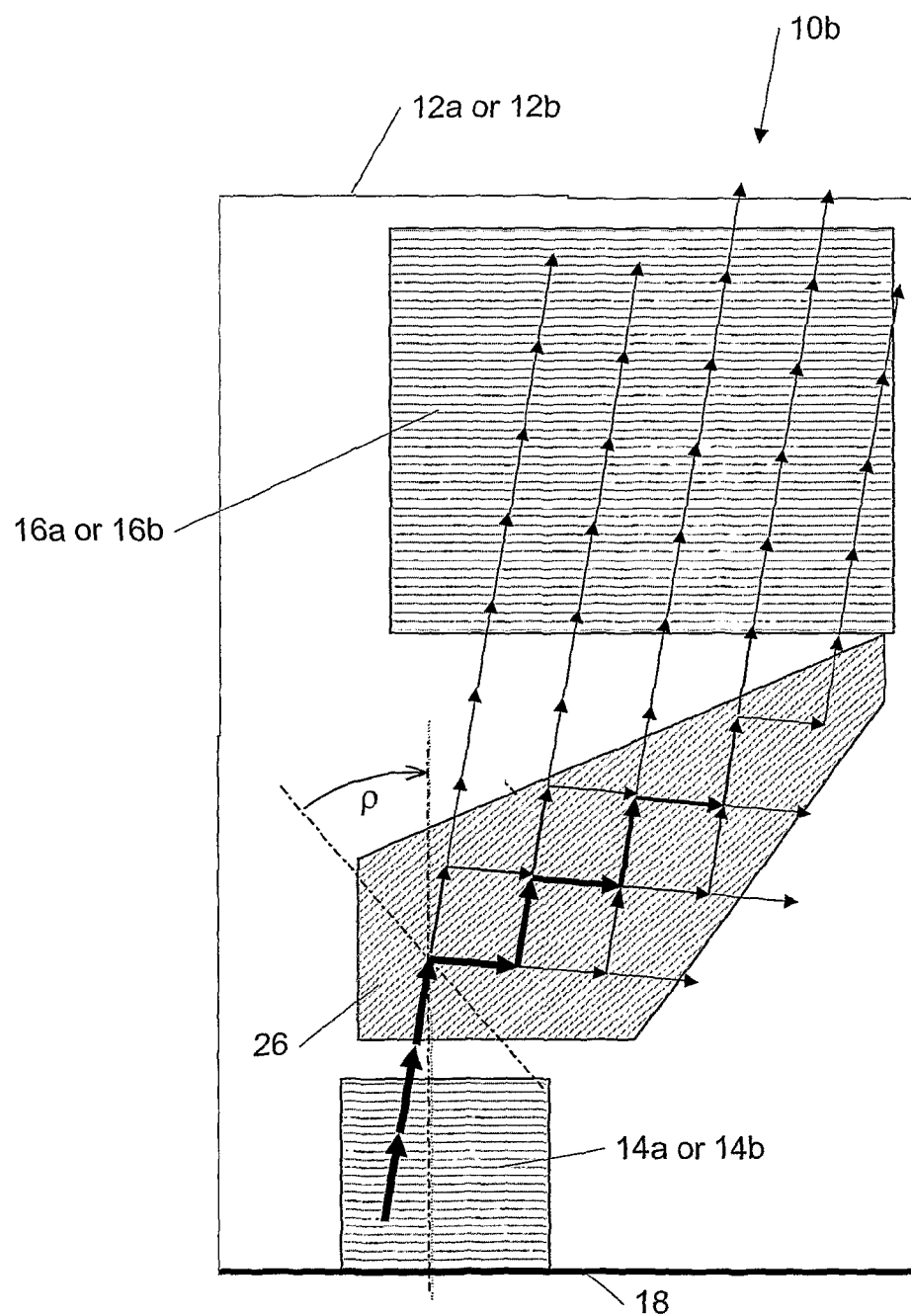

FIGS. 4a and 4b show further examples among others of schematic representations of one part (12a or 12b) of split two-dimensional diffractive exit pupil expanders 10a and 10b, respectively, according to an embodiment of the present invention. An intermediate diffractive element (a diffraction grating) 24 or 26 has odd number of first order diffractions (shown in FIG. 4a) or even number of further first order reflections (shown in FIG. 4b) as described by T. Levola in "Diffractive Optics for Virtual Reality Displays", SID Eurodisplay 05, Edinburg (2005), SID 02 Digest, Paper 22.1. The angle ρ is a rotation angle between the periodic lines of the intermediate diffraction grating 24 or 26 and the in-coupling split grating 14a or 14b.

According to a further embodiment of the present invention, the relationship between a period d of periodic lines of the in-coupling grating 14a or 14b and a period d' of further periodic lines of the intermediate diffraction grating 16a or 16b can be expressed as follows:

$$d' = \frac{d}{\left(1 + \frac{d}{\lambda}\sin\alpha\right)2\cos\rho},$$

wherein α is an angle between the adjacent parts 12a or 12b and a plane 13 as shown in FIG. 2a, ρ is an angle between the periodic lines of the in-coupling grating 14a or 14b and the further periodic lines of the intermediate diffraction grating 16a or 16b as shown in FIGS. 4a and 4b, and λ is a wavelength of the input optical beam.

Figure 5:
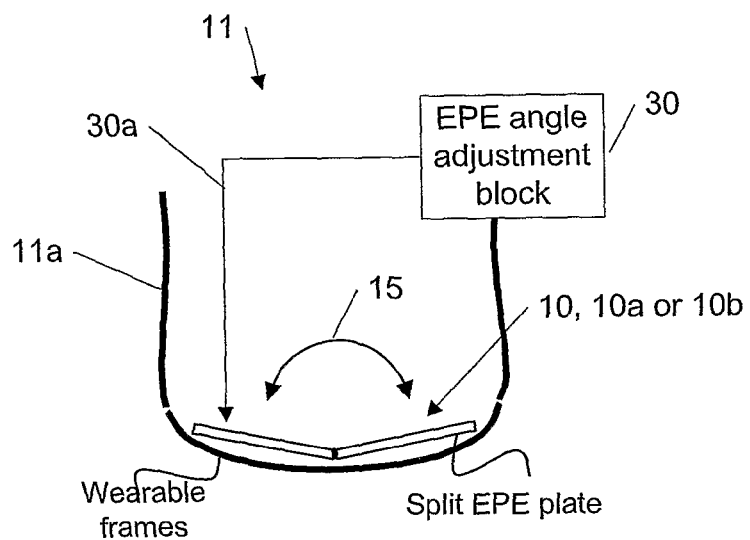
FIG. 5 is a schematic representation of a flat diffractive exit pupil expander in a "sunglass like" frame, according to an embodiment of the present invention.

FIG. 5 show further examples among others of schematic representations of a split diffractive exit pupil expander 10, 10a or 10b in a goggle 11 comprising a wearable housing 11a, according to an embodiment of the present invention. The exit pupil expander 10, 10a or 10b is operatively attached to the wearable housing 11a such that the split parts (the first and the second parts) of the split EPE 10, 10a or 10b can be rotated in the predetermined angle range, according to embodiments of the present invention. The wearable housing 11a can be a glass housing, such as a sunglass frame, or a spectacle frame or alike. FIG. 5 also shows an EPE angle adjustment block 30 which can be a part of the frame 11 and which can be used to provide an adjustment signal 30a for rotating the split parts of the split EPE 10, 10a or 10b in the predetermined angle range to provide the most comfortable and efficient position for viewing.

Figure 6:
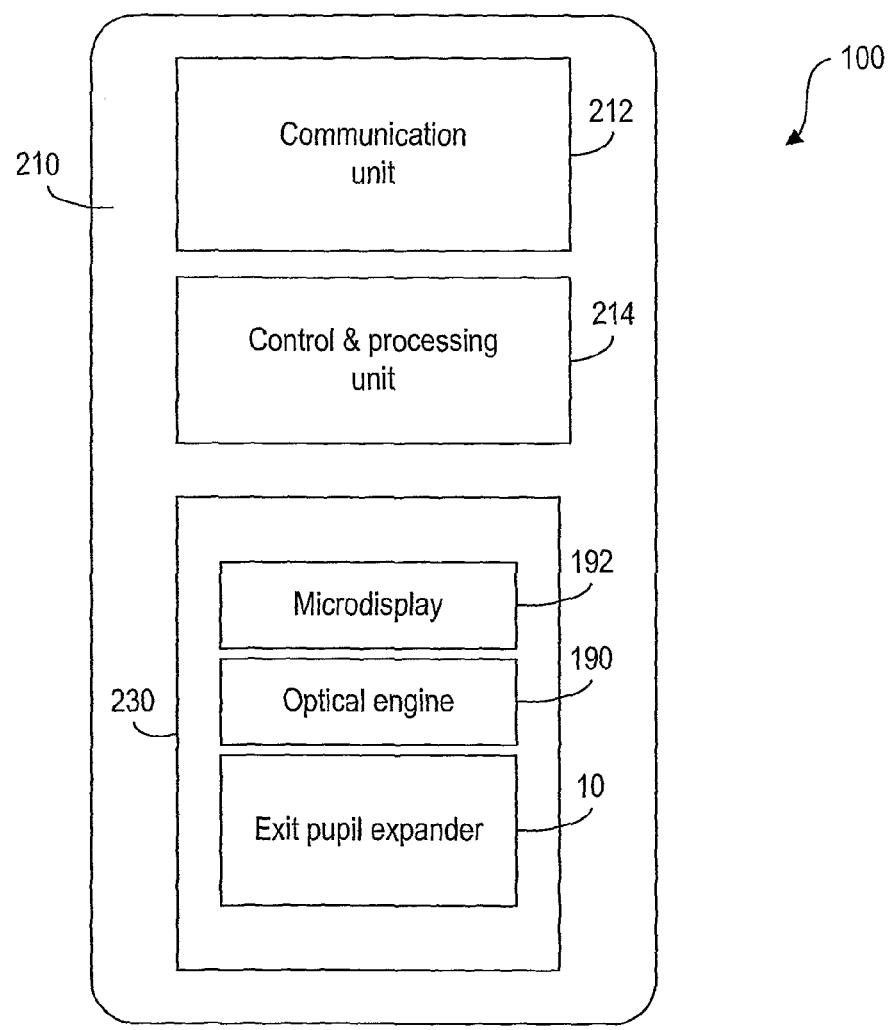
FIG. 6 is a schematic representation of an electronic device, having an exit pupil expander, according to an embodiment of the present invention.

FIG. 6 shows an example of a schematic representation of an electronic device, having the exit pupil expander (EPE) 10, 10a or 10b, according to an embodiment of the present invention.

The exit pupil expander (EPE) 10, 10a or 10b can be used in an electronic (portable) device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 6, the portable device 100 has a housing 210 to house a communication unit 212 for receiving and transmitting information from and to an external device (not shown). The portable device 100 also has a controlling and processing unit 214 for handling the received and transmitted information, and a virtual display system 230 for viewing. The virtual display system 230 includes a micro-display or an image source 192 and an optical engine 190. The controlling and processing unit 214 is operatively connected to the optical engine 190 to provide image data to the image source 192 to display an image thereon. The EPE 10, 10a or 10b, according to the present invention, can be optically linked to an optical engine 190.

Furthermore, the image source 192, as depicted in FIG. 6, can be a sequential color LCOS (Liquid Crystal On Silicon) device, an OLED (Organic Light Emitting Diode) array, an MEMS (MicroElectro Mechanical System) device or any other suitable micro-display device operating in transmission, reflection or emission.

Moreover, the electronic device 100 can be a portable device, such as a mobile phone, personal digital assistant (PDA), communicator, portable Internet appliance, hand-held computer, digital video and still camera, wearable computer, computer game device, specialized bring-to-the-eye product for viewing and other portable electronic devices. However, the exit pupil expander, according to the present invention, can also be used in a non-portable device, such as a gaming device, vending machine, band-o-matic, and home appliances, such as an oven, microwave oven and other appliances and other non-portable devices.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
a split substrate of optical material having a first surface and a second surface, said split substrate comprising a first part and a second part which are physically separated and configured to rotate relative to each other around a line which separates the first and the second parts in a predetermined angle range;
two diffractive elements disposed on the first or the second surface and configured to receive an input optical beam, wherein one of the two diffractive elements is disposed on the first part and another of the two diffractive elements is disposed on the second part, respectively, and said two diffractive elements are substantially next to each other and adjacent to said line which separates the first and the second parts; and
two further diffractive elements disposed on the first or the second surface, wherein one of the two further diffractive elements is disposed on the first part and another of said two further diffractive elements is disposed on the second part, respectively, wherein
at least part of the input optical beam is diffracted in the two diffractive elements to provide two diffracted optical beams substantially equally divided between the first part and the second part, respectively, substantially within the first and second surfaces, and
at least part of the diffracted optical beams in each of the first part and the second part is further coupled out of the split substrate by diffraction in each of said two further diffractive elements to provide substantially identical two output optical beams with an expanded exit pupil in one or two dimensions.

2. The apparatus of claim 1, wherein said apparatus is configured using at least one condition of:
two areas, each occupied by one of said two diffractive elements, are symmetric relative to said line which separates the first and the second parts, and
two further areas, each occupied by one of said two further diffractive elements, are symmetric relative to said line which separates the first and the second parts.

3. The apparatus of claim 1, wherein said two diffractive elements have an asymmetric groove shape such that the input optical beam diffracted by each of the two diffractive elements is substantially coupled only to a part, out of the first and the second parts, in which said each of the two diffractive elements is disposed.

4. The apparatus of claim 1, wherein said two diffractive elements have an asymmetric groove shape and are slanted gratings with a slanting angle of more than 20 degrees.

5. The apparatus of claim 1, wherein said two diffractive elements are asymmetric such that their groove shapes are mirror images of each other with respect to the line which separates the first and the second parts.

6. The apparatus of claim 1, wherein said two diffractive elements and said two further diffractive elements are disposed on one surface, the first surface or the second surface of said first and second parts of the split substrate.

7. The apparatus of claim 1, wherein an absorbing material is deposited on at least one of:
an end of at least one of the first and the second parts in an area of their physical separation along said line, and
a surface of the split substrate opposite to the surface with disposed said two diffractive elements.

8. The apparatus of claim 1, wherein grooves of said two diffractive elements are symmetric relative to said line which separates the first and the second parts.

9. The apparatus of claim 1, wherein said each part, the first and the second part of said split substrate, comprises an intermediate diffractive element such that the at least part of the optical beam diffracted in the first or the second diffractive element is first coupled to said intermediate diffractive element, which then couples, using a further diffraction in said intermediate diffractive element, said at least part of said diffracted optical beam to one of said two further diffractive elements disposed on said each part, to provide a two-dimensional exit pupil expansion of said input optical beam by said each part.

10. The apparatus of claim 9, wherein each of said two diffractive elements comprises periodic lines with a period d and said intermediate diffractive element comprises further periodic lines with a period d' equal to $$d' = \frac{d}{\left(1 + \frac{d}{\lambda}\sin\alpha\right)2\cos\rho},$$

wherein $\alpha$ is an angle between a normal to the first part or the second part and a normal to a plane comprising the first part and the second part when the first part and the second part are rotated in said predetermined angle range to lie both in said plane, $\rho$ is an angle between the periodic lines and the further periodic lines, and $\lambda$ is a wavelength of the input optical beam.

11. The apparatus of claim 9, wherein said apparatus is configured that the intermediate diffractive element has an odd number of first order diffractions or an even number of further first order reflections.

12. A method, comprising:
receiving an input optical beam by two diffractive elements disposed on a first or a second surface of a split substrate made of optical material, said split substrate comprising a first part and a second part which are physically separated and configured to rotate relative to each other around a line which separates the first and the second parts in a predetermined angle range, and wherein one of the two diffractive elements is disposed on the first part and another of the two diffractive elements is disposed on the second part, respectively, and said two diffractive elements are substantially next to each other and adjacent to said line which separates the first and the second parts, and two areas, each occupied by one of said two diffractive elements, are symmetric relative to said line which separates the first and the second parts;
diffracting at least part of the input optical beam in the two diffractive elements to provide two diffracted optical beams substantially equally divided between the first part and the second part, respectively, substantially within the first and second surfaces;
coupling at least part of the diffracted optical beams in each of the first part and the second part out of the split substrate by diffraction in each of two further diffractive elements to provide substantially identical two output expanded optical beams with expanded exit pupil in one or two dimensions,
wherein the two further diffractive elements are disposed on the first or the second surface, wherein one of the two further diffractive elements is disposed on the first part and another of said two further diffractive elements is disposed on the second part, respectively.

13. The method of claim 12, wherein said two diffractive elements have an asymmetric groove shape such that the input optical beam diffracted by each of the two diffractive elements is substantially coupled only to a part, out of the first and the second parts, in which said each of the two diffractive elements is disposed.

14. The method of claim 12, wherein said two diffractive elements are asymmetric such that their groove shapes are mirror images of each other with respect to the line which separates the first and the second parts.

15. The method of claim 12, wherein an absorbing material is deposited on at least one of:
an end of at least one of the first and the second parts in an area of their physical separation along said line, and
a surface of the split substrate opposite to the surface with disposed said two diffractive elements.

16. An electronic device, comprising:
a data processing unit;
an optical engine operatively connected to the data processing unit for receiving image data from the data processing unit;
a display device operatively connected to the optical engine for forming an image based on the image data; and
an exit pupil expander comprising:
a split substrate of optical material having a first surface and a second surface, said split substrate comprising a first part and a second part which are physically separated and configured to rotate relative to each other around a line which separates the first and the second parts in a predetermined angle range;
two diffractive elements disposed on the first or the second surface and configured to receive an input optical beam, wherein one of the two diffractive elements is disposed on the first part and another of the two diffractive elements is disposed on the second part, respectively, and said two diffractive elements are substantially next to each other and adjacent to said line which separates the first and the second parts; and
two further diffractive elements disposed on the first or the second surface, wherein one of the two further diffractive elements is disposed on the first part and another of said two further diffractive elements is disposed on the second part, respectively, wherein
at least part of the input optical beam is diffracted in the two diffractive elements to provide two diffracted optical beams substantially equally divided between the first part and the second part, respectively, substantially within the first and second surfaces, and
at least part of the diffracted optical beams in each of the first part and the second part is further coupled out of the split substrate by diffraction in each of said two further diffractive elements to provide substantially identical two output optical beams with an expanded exit pupil in one or two dimensions.

17. The electronic device of claim 16, further comprises:
an EPE angle adjustment block configured to rotate the first part and the second part relative to each other around said line.

18. The electronic device of claim 16, wherein said electronic device is a digital camera, a computer game device, a wireless device, a portable device or a mobile terminal.

19. The electronic of claim 16, wherein said electronic device is configured using at least one condition of:
two areas, each occupied by one of said two diffractive elements, are symmetric relative to said line which separates the first and the second parts, and
two further areas, each occupied by one of said two further diffractive elements, are symmetric relative to said line which separates the first and the second parts.

20. The electronic device of claim 16, wherein said two diffractive elements have an asymmetric groove shape such that the input optical beam diffracted by each of the two diffractive elements is substantially coupled only to a part, out of the first and the second parts, in which said each of the two diffractive elements is disposed.

21. The electronic device of claim 16, wherein said two diffractive elements are asymmetric such that their groove shapes are mirror images of each other with respect to the line which separates the first and the second parts.

22. The electronic device of claim 16, wherein said two diffractive elements and said two further diffractive elements are disposed on one surface, the first surface or the second surface of said first and second parts of the split substrate.

23. The electronic device of claim 16, wherein an absorbing material is deposited on at least one of:
an end of at least one of the first and the second parts in an area of their physical separation along said line, and
a surface of the split substrate opposite to the surface with disposed said two diffractive elements.

24. A goggle, comprising:
a wearable housing; and
an exit pupil expander, operatively attached to said wearable housing, said exit pupil expander comprising:
a split substrate of optical material having a first surface and a second surface, said split substrate comprising a first part and a second part which are physically separated and configured to rotate relative to each other around a line which separates the first and the second parts in a predetermined angle range;
two diffractive elements disposed on the first or the second surface and configured to receive an input optical beam, wherein one of the two diffractive elements is disposed on the first part and another of the two diffractive elements is disposed on the second part, respectively, and said two diffractive elements are substantially next to each other and adjacent to said line which separates the first and the second parts; and
two further diffractive elements disposed on the first or the second surface, wherein one of the two further diffractive elements is disposed on the first part and another of said two further diffractive elements is disposed on the second part, respectively, wherein
at least part of the input optical beam is diffracted in the two diffractive elements to provide two diffracted optical beams substantially equally divided substantially next to each other and adjacent to said line which separates the first and the second parts; and
two further diffractive elements disposed on the first or the second surface, wherein one of the two further diffractive elements is disposed on the first part and another of said two further diffractive elements is disposed on the second part, respectively, wherein
at least part of the input optical beam is diffracted in the two diffractive elements to provide two diffracted optical beams substantially equally divided between the first part and the second part, respectively, substantially within the first and second surfaces, and
at least part of the diffracted optical beams in each of the first part and the second part is further coupled out of the split substrate by diffraction in each of said two further diffractive elements to provide substantially identical two output optical beams with an expanded exit pupil in one or two dimensions, such that each of said two output optical beams is provided to only one part, left or right, of said goggles.

25. The goggle of claim 24, further comprising:
an exit pupil expander angle adjustment block, configured to provide an adjustment signal to the exit pupil expander for rotating said first and second parts relative to each other in said predetermined angle range.

* * * * *

UNITED STATES PATENT AND TRADEMARK OFFICE
CERTIFICATE OF CORRECTION

| | | |
|---|---|---|
| PATENT NO. | : 8,314,993 B2 | Page 1 of 1 |
| APPLICATION NO. | : 12/227730 | |
| DATED | : November 20, 2012 | |
| INVENTOR(S) | : Levola | |

It is certified that error appears in the above-identified patent and that said Letters Patent is hereby corrected as shown below:

In the Specification

<u>Column 1,</u>
Lines 10 through 14 should read:

--PRIORITY AND CROSS-REFERENCE TO
RELATED APPLICATION

This application is a U.S. national phase entry of International Application No. PCT/IB2007/000875 filed on April 3, 2007, which claims priority to International Application No. PCT/IB2006/001456 filed on June 2, 2006.--.

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,314,993 B2 | Page 1 of 1 |
| APPLICATION NO. | : 12/227730 | |
| DATED | : November 20, 2012 | |
| INVENTOR(S) | : Levola | |

It is certified that error appears in the above-identified patent and that said Letters Patent is hereby corrected as shown below:

In the Specification

Column 1,
Lines 3 through 14 should read:
--PRIORITY AND CROSS-REFERENCE TO
RELATED APPLICATION This application is a U.S. national phase entry of International Application No. PCT/IB2007/000875 filed on April 3, 2007, which claims priority to International Application No. PCT/IB2006/001456 filed on June 2, 2006.--.

This certificate supersedes the Certificate of Correction issued October 15, 2013.

Signed and Sealed this
Twentieth Day of October, 2015

Michelle K. Lee
*Director of the United States Patent and Trademark Office*